US008460089B2

(12) United States Patent
Pires

(10) Patent No.: US 8,460,089 B2
(45) Date of Patent: Jun. 11, 2013

(54) GAMING SYSTEM, GAMING CONTROLLER, AND A PRIZE TRIGGERING METHOD

(75) Inventor: Claudio Daniel Dias Pires, Bonnyrigg Heights (AU)

(73) Assignee: Aristocrat Technologies Australia PTY Limited, North Ryde (AU)

( * ) Notice: Subject to any disclaimer, the term of this patent is extended or adjusted under 35 U.S.C. 154(b) by 449 days.

(21) Appl. No.: 12/430,679

(22) Filed: Apr. 27, 2009

(65) Prior Publication Data

US 2009/0270165 A1 Oct. 29, 2009

(30) Foreign Application Priority Data

Apr. 28, 2008 (AU) ................................ 2008902096

(51) Int. Cl.
*A63F 13/00* (2006.01)

(52) U.S. Cl.
USPC .................. 463/23; 438/24; 438/30; 438/32; 438/42

(58) Field of Classification Search
USPC .......................................................... 463/20
See application file for complete search history.

(56) References Cited

U.S. PATENT DOCUMENTS 6,135,884 A 10/2000 Hedrick et al.
6,315,666 B1 11/2001 Mastera et al.
6,368,216 B1 4/2002 Hedrick et al.
6,652,378 B2 11/2003 Cannon et al.
6,722,979 B2 4/2004 Gilmore et al.
6,860,810 B2 3/2005 Cannon et al.
6,887,157 B2 5/2005 LeMay et al.
7,318,774 B2 * 1/2008 Bryant et al. .................. 463/25
2002/0183105 A1 12/2002 Cannon et al.
2003/0027624 A1 2/2003 Gilmore et al.
2003/0032479 A1 2/2003 LeMay et al.
2003/0060271 A1 3/2003 Gilmore et al.
2003/0134677 A1 7/2003 Obied et al.
2003/0186739 A1 10/2003 Paulsen et al.
2004/0048646 A1 * 3/2004 Visocnik ........................ 463/16
2004/0102238 A1 5/2004 Taylor
2004/0106466 A1 6/2004 Wieland et al.
2004/0162128 A1 * 8/2004 Baerlocher et al. ............ 463/16
2004/0209673 A1 * 10/2004 Shiraishi ......................... 463/20
2005/0026676 A1 * 2/2005 Olive .............................. 463/20
2005/0059478 A1 3/2005 Peterson et al.
2005/0075167 A1 4/2005 Beaulieu et al.
2005/0130731 A1 6/2005 Englman et al.
2005/0233794 A1 10/2005 Cannon et al.
2005/0233799 A1 10/2005 LeMay et al.
2006/0019738 A1 1/2006 Baerlocher et al.
2006/0025201 A1 * 2/2006 Van Asdale ..................... 463/20
2006/0030387 A1 2/2006 Jackson (Continued)

FOREIGN PATENT DOCUMENTS

EP 0919965 A2 2/1999
EP 0896304 A2 10/1999

(Continued)

*Primary Examiner* — Kyoung Lee
*Assistant Examiner* — Ankush Singal
(74) *Attorney, Agent, or Firm* — Hanley, Flight and Zimmerman, LLC.

(57) ABSTRACT

A triggering method for a win outcome on a gaming device includes determining an amount of credit on commencement of game play. A number of symbols displayed in the game is adjusted as a function of the amount bet, to thereby affect the probability of a win outcome being generated.

26 Claims, 9 Drawing Sheets

U.S. PATENT DOCUMENTS

| | | | | |
|---|---|---|---|---|
| 2006/0084492 | A1 | 4/2006 | Baerlocher et al. | |
| 2006/0084498 | A1 | 4/2006 | Baerlocher et al. | |
| 2006/0178187 | A1 | 8/2006 | Walker et al. | |
| 2006/0189378 | A1 | 8/2006 | Aoki | |
| 2006/0287058 | A1 | 12/2006 | Resnick et al. | |
| 2007/0015576 | A1* | 1/2007 | Sato et al. | 463/30 |
| 2007/0060316 | A1 | 3/2007 | O'Halloran | |
| 2007/0117608 | A1 | 5/2007 | Roper et al. | |
| 2007/0178959 | A1 | 8/2007 | Halprin | |
| 2007/0191087 | A1 | 8/2007 | Thomas et al. | |
| 2008/0020825 | A1* | 1/2008 | Cuddy et al. | 463/25 |
| 2008/0096633 | A1* | 4/2008 | Power | 463/20 |
| 2008/0096635 | A1* | 4/2008 | Power | 463/20 |
| 2008/0096636 | A1* | 4/2008 | Power | 463/20 |
| 2008/0096640 | A1* | 4/2008 | Bennett et al. | 463/20 |
| 2008/0125212 | A1* | 5/2008 | Schofield | 463/20 |
| 2008/0194312 | A1* | 8/2008 | Nelson et al. | 463/20 |
| 2008/0194317 | A1* | 8/2008 | Baerlocher | 463/20 |
| 2008/0261676 | A1* | 10/2008 | Fujimoto et al. | 463/20 |
| 2008/0261684 | A1* | 10/2008 | Vallejo et al. | 463/27 |
| 2009/0124389 | A1* | 5/2009 | Nelson et al. | 463/42 |
| 2009/0305766 | A1 | 12/2009 | Ashley et al. | |
| 2010/0105470 | A1* | 4/2010 | Englman | 463/27 |

FOREIGN PATENT DOCUMENTS

| | | | |
|---|---|---|---|
| EP | 0896308 | A1 | 10/1999 |
| EP | 1282088 | A2 | 5/2003 |
| EP | 1369830 | A1 | 10/2003 |
| WO | 02/099760 | A2 | 12/2002 |

* cited by examiner

GAMING SYSTEM, GAMING CONTROLLER, AND A PRIZE TRIGGERING METHOD

CROSS-REFERENCE TO RELATED APPLICATIONS

The present application claims the benefit of priority to Australian Provisional Patent Application No. 2008902096, filed on Apr. 28, 2008, entitled "A GAMING SYSTEM, GAMING CONTROLLER, AND A PRIZE TRIGGERING METHOD", which is herein incorporated by reference in its entirety.

FIELD

The present invention relates to a gaming system, a gaming controller, and a prize triggering method.

BACKGROUND

It is known to provide a gaming system which comprises a game controller arranged to randomly display several symbols from a predetermined set of symbols and to determine a game outcome such as a game win based on the displayed symbols. Such gaming systems may commonly be implemented as a stepper machine provided with reels with each reel carrying several symbols of the set, or a video machine wherein selected symbols are displayed on virtual reels on a graphical display device. Win outcomes can occur based on symbols appearing in one or more horizontal lines, diagonal lines, or any other predetermined way.

Many venues employ jackpot controllers for awarding jackpots to one or more gaming machines participating in the jackpot. Typically, a portion of turnover received during game play, from each gaming machine, is forwarded to a jackpot controller as a contribution. That is, part of each wager goes towards the jackpot. The technique can be implemented within a single gaming machine or may be extended to a so called wide area jackpot where multiple gaming machines (from one or more different venues) contribute to a single jackpot pool.

One way of awarding a jackpot is a so called "symbol driven" jackpot, where a predetermined symbol pattern or win outcome triggers the jackpot.

There is a need for an alternative technique for determining prizes for win outcomes to a player.

SUMMARY

In a first aspect there is provided a triggering method for a win outcome on a gaming device, including, determining an amount of credit bet in commencement of game play, and adjusting a number of symbols displayed in the game as a function of the amount bet, to thereby affect the probability of a win outcome being generated from the plurality of symbols displayed.

In an embodiment, the method includes the further step of satisfying a trigger condition when a specific symbol combination is displayed.

In an embodiment, the method includes causing a feature game to commence, a prize to be awarded, or multiplying a prize for a winning outcome when the trigger condition is satisfied.

In an embodiment, the number of symbols displayed is increased by a particular amount when the amount of credit bet exceeds or meets a specific value. The particular amount may, for example, correspond to the amount bet.

In an embodiment, the game is a reel game and the number of the symbols displayed is dependent on an amount bet per pay line selected in the reel game.

In an embodiment, the number of symbols displayed is directly proportional to the amount bet.

In a second aspect there is provided a jackpot triggering method for symbol jackpots, including, determining an amount of credit bet on commencement of game play, and adjusting a number of symbols displayed in the game as a function of the amount bet, to thereby affect the probability of a jackpot being awarded.

In an embodiment, the number of symbols displayed is increased when the amount of credit bet is increased.

In an embodiment, the number of symbols displayed is directly proportional to the amount of credit bet.

In an embodiment, a correct symbol combination invokes an additional game that provides the player with an opportunity to win the jackpot. Alternatively or additionally, a correct symbol combination may cause the jackpot to be awarded to the player.

There may be provided a plurality of jackpots, each jackpot requiring a different symbol combination in order to be awarded to the player.

In a third aspect, the present invention provides a. controller arranged to control play of a game on a gaming device, the controller including:

a betting module operable to determine an amount of credit bet on commencement of the game; and a display module operable adjust a number of symbols displayed within a reel window of the gaming device dependent on the amount bet, to thereby affect the probability of a win outcome being generated.

In an embodiment, the controller further includes a trigger module arranged to invoke a trigger condition upon determining that a specific symbol combination is displayed on the gaming device.

In an embodiment, the controller is arranged to cause a feature game to commence, a prize to be awarded, or multiplying a prize for a winning outcome when the trigger condition is invoked.

In an embodiment, the number of symbols displayed is increased by a particular value when the amount of credit bet exceeds or meets a specific value.

In an embodiment, the particular value corresponds to the amount bet.

In an embodiment, the game is a reel-type game and the number of symbols displayed is dependent on an amount bet per pay line selected in the reel-type game.

In a fourth aspect, the present invention provides a controller arranged to determine the amount of credit bet on commencement of game play, and adjust a number of symbols displayed within a reel window dependent on the amount bet, to thereby affect the probability of a win outcome.

In a fifth aspect the present invention provides a gaming system including:

a display operable to display a plurality of standard symbol positions and optionally one or more additional symbol positions;

a betting module arranged to determine an amount bet on commencement of a game;

a symbol selector arranged to select symbols for display in the plurality of standard symbol positions and, dependent on the amount wagered, further arranged to select and display symbols in the additional symbol position(s); and an outcome determiner arranged to determine an outcome of the game based on the displayed symbols.

In an embodiment, the symbol selected displays are single in the additional symbol position(s) when the amount bet meets or exceeds a designated threshold.

In an embodiment, the number of additional symbols displayed corresponds to the amount bet.

In an embodiment, the system is arranged such that when a particular number or combination of symbols are displayed in the standard and/or additional symbol positions, a trigger condition is satisfied. The trigger condition may, for example, cause the gaming system to instruct play of a feature game, trigger a win outcome, or multiply a prize awarded for a winning outcome. The win outcome, may, for example, be the awarding of a jackpot prize. The jackpot prize may be funded from a jackpot prize pool funded from contribution made by the gaming device and other gaming devices participating in the jackpot event.

In an embodiment, the plurality of standard symbols are displayed in a format having an array of rows and columns and whereby the or each additional symbol position is associated with one of the rows or columns.

In an embodiment, the system is arranged such that standard symbol positions define at least one player selectable play line used to determine a game outcome, and such that symbols displayed in the additional symbol position(s) can also form part of a play line dependent on their location.

In an embodiment, the row or column with which the or each additional symbol position is associated is randomly determined.

In a sixth aspect, the present invention provides a gaming system including a plurality of gaming devices which may participate in a jackpot by making jackpot contributions; and a jackpot controller arranged to:

for each of the plurality of gaming devices, determine the amount of credit bet on commencement of game play, and control adjustment of the number of symbols displayed within the reel window on the respective gaming device dependent on the amount bet, to thereby affect the probability of a jackpot being awarded to that gaming device.

In a seventh aspect, the invention provides computer program code which when executed implements any one of the above method aspects.

In an eighth aspect, the invention provides a computer readable medium including the program code according to the seventh aspect.

In a ninth aspect, the invention provides a data signal including the program code of the seventh aspect.

BRIEF DESCRIPTION OF THE DRAWINGS

Features and advantages of the present invention will become apparent from the following description of embodiments thereof, by way of example only, with reference to the accompanying drawings, in which.

Features, further aspects, and advantages of the present invention will become apparent from the following description of embodiments thereof, by way of example only, with reference to the accompanying drawings. Also, various embodiments of the aspects described in the preceding paragraphs will be apparent from the appended claims, the following description and/or the accompanying drawings. It should be understood, however, that the present invention is not limited to the arrangements and instrumentality shown in the attached drawings.

DETAILED DESCRIPTION OF CERTAIN EMBODIMENTS

In an embodiment a method and system is provided for affecting the probability of a win outcome which in turn affects the probability of a prize, such as a jackpot, being awarded. The embodiment determines the amount of credit bet by a player on commencement of game play. The number of symbols displayed in the game is set depending on the credit bet, to thereby affect the probability of a win outcome being awarded.

The gaming system may be provided in a number of different forms.

In a first form, a stand alone gaming machine is provided wherein all or most components to implement the game are present in a player operable gaming machine.

In a second form, a distributed architecture is provided wherein some of the components to implement the game are present in a player operable gaming machine and some of the components to implement the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 1:
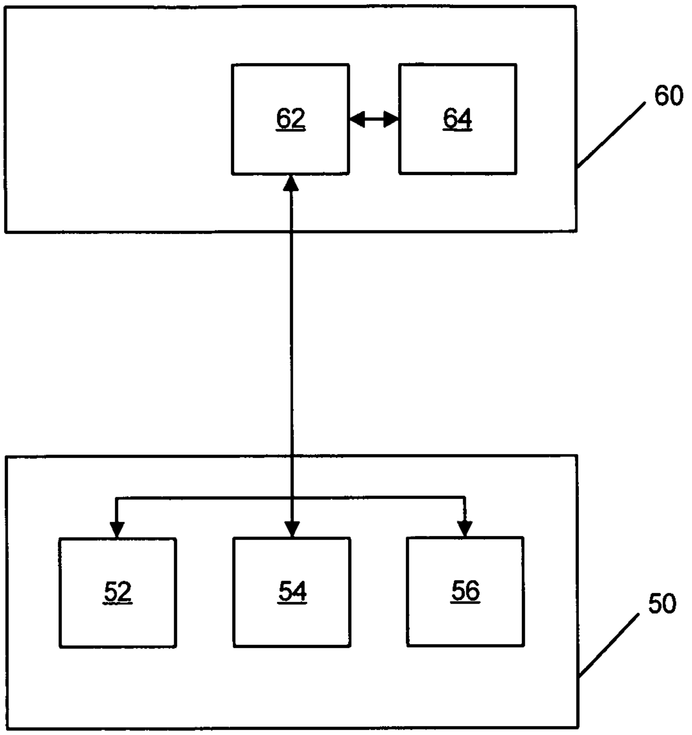
FIG. 1 is a schematic block diagram of core components of a gaming system in accordance with an embodiment of the present invention.

Irrespective of the form, the gaming system includes several core components. At the broadest level, the core components are a player interface 50 and a game controller 60 as illustrated in FIG. 1. The player interface is arranged to enable manual interaction between a player and the gaming system and for this purpose includes the input/output components for the player to enter instructions and play the game.

Components of the player interface may vary from embodiment to embodiment but will typically include a credit mechanism 52 to enable a player to input credits and receive payouts, one or more displays 54 and a game play mechanism 56 that enables a player to input game play instructions.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
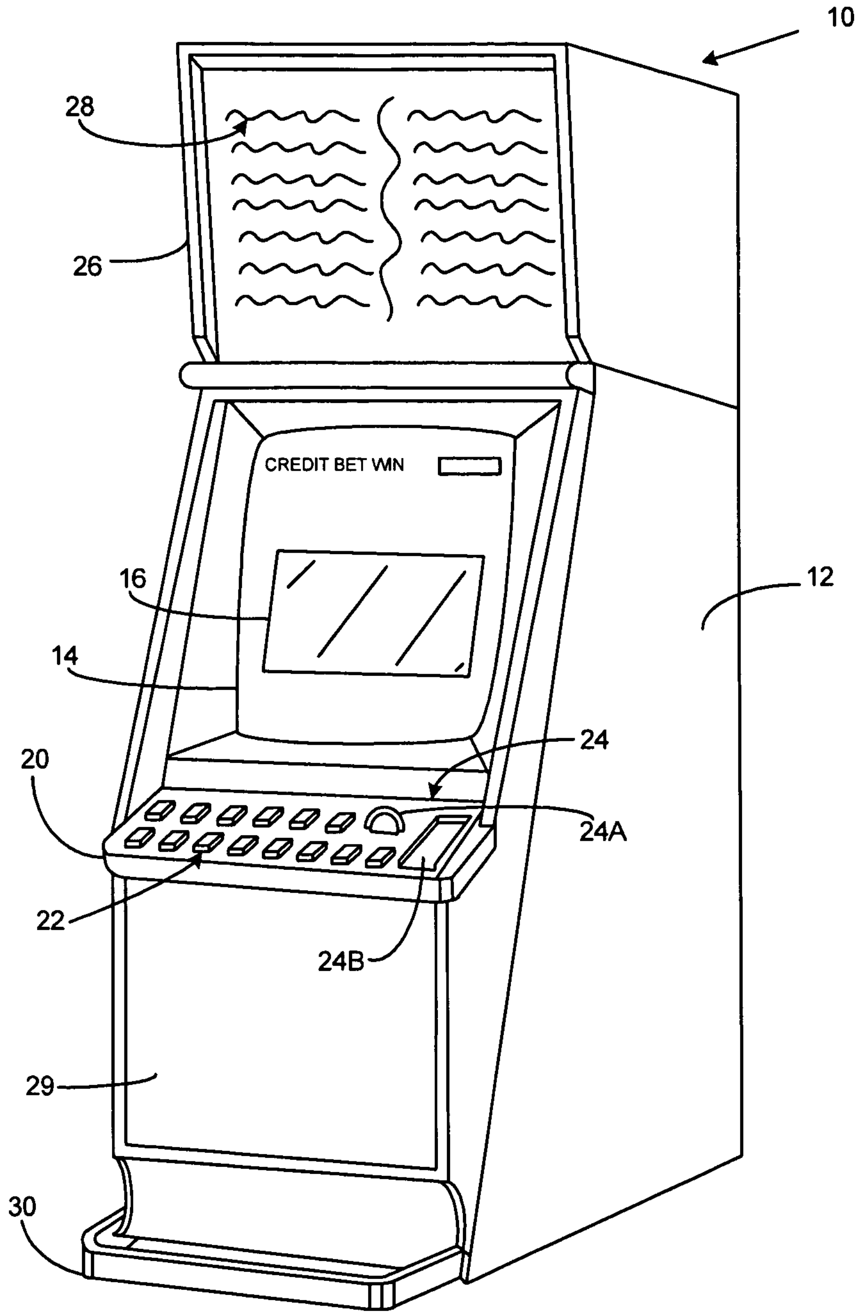
FIG. 2 is a diagrammatic representation of a gaming system in accordance with an embodiment of the present invention with the gaming system implemented in the form of a stand alone gaming machine.

A gaming system in the form of a stand alone gaming machine 10 is illustrated in FIG. 2. The gaming machine 10 includes a console 12 having a display 14 on which is displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A player marketing module may be provided having a reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
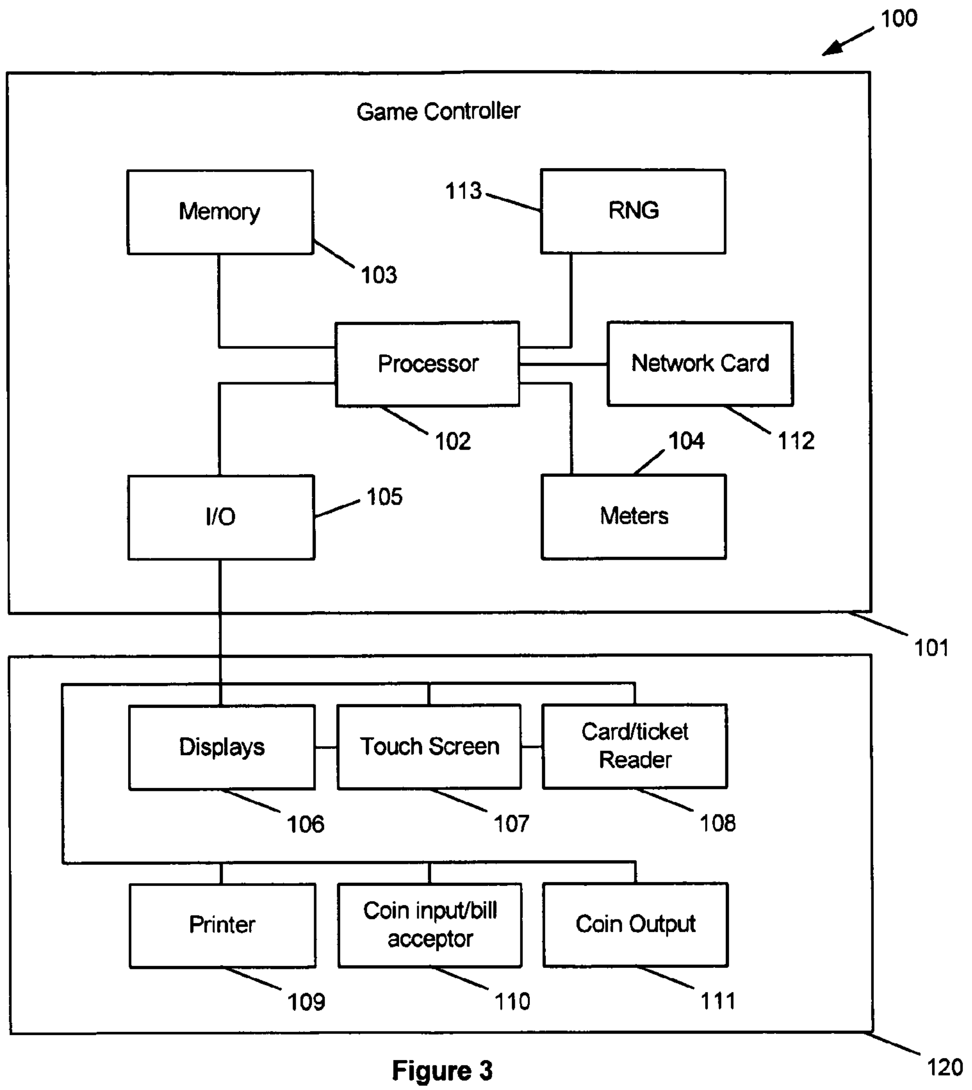
FIG. 3 is a schematic block diagram of operative components of the gaming machine shown in FIG. 2.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 include one or more displays 106, a touch screen and/or buttons 107, a card and/or ticket reader 108, a printer 109, a bill acceptor and/or coin input mechanism 110 and a coin output mechanism 111. Additional hardware may be included as part of the gaming machine 100, or hardware may be omitted based on the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
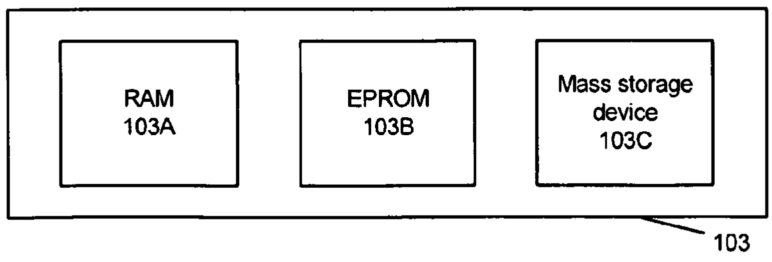
FIG. 4 is a schematic block diagram of components of a memory of the gaming machine shown in FIG. 2.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
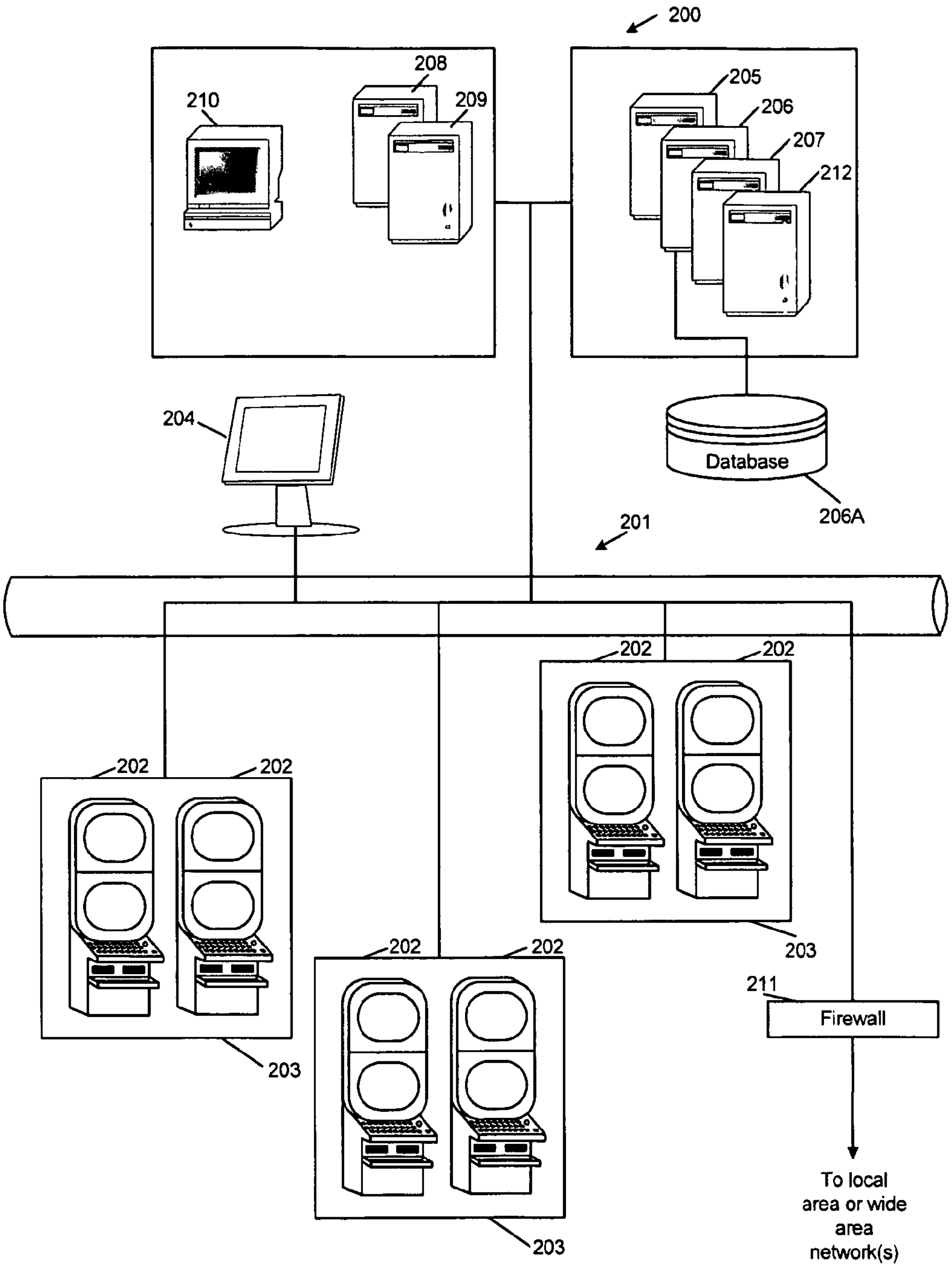
FIG. 5 is a schematic diagram of a gaming system in accordance with an alternative embodiment of the present invention with the gaming system implemented over a network.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10,100 shown in FIGS. 2 and 3, or may have simplified functionality depending on the rules, guidelines, and/or preferences for implementing game play. While banks 203 of two gaming machines are illustrated in FIG. 5, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to carry out the accounting in respect of the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of games servers could be provided to run different games or a single game server may run a plurality of different games based on the terminals.

Embodiments may be implemented in relation to a spinning reel type game. Gaming systems for implementing games that involve a display of spinning reels as part of the display of the outcome of a game have either a video display or a mechanical display, these later machines most usually being "stepper" machines which have a separate motor for each reel. However, persons skilled in the art will appreciate that the invention can be implemented in respect of other forms of games, including; card games; ball draw games; dice games; and pin and ball games.

In some implementations the game controllers of such gaming machines select symbols by employing a stop determining function that randomly determines the stop position for each reel. For example, if there are five reels, each having twenty symbols, the stop determining function might determine that the stop positions are positions: 3, 13, 7, 9 and 17. The spinning of the reels is then controlled so that each symbol comes to a stop in the same row, typically a predetermined row in a "window" visible to the player on the display that corresponds to a player playing a single win line. When a reel stops, the symbols will be in one of a plurality of possible symbol positions for that reel relative to the stop position.

Spinning reel type games typically allow a player to select how many win lines of a plurality of win lines they will play in each game—i.e. a minimum of one win line up to the maximum number of win lines allowed by the game. Persons, skilled in the art, will appreciate that in other embodiments, the player may select a number of reels to play. Each win line is formed by a set of symbol positions consisting of one symbol position from each reel. That is, a predetermined symbol position of each reel is assigned to a win line. The symbol positions that constitute each of the win lines are usually advertised to the player by markings on the display or diagrams showing the symbol positions that correspond to each win line. Some of the win lines will be horizontal or diagonal lines but others may be non-linear combinations of symbols. Typically, the win lines will be constituted by symbol positions in the visible window. A game outcome is determined based on the symbols on the win lines and a prize table that specifies awards.

In some gaming machines, the prizes (awards payable to a player) may include a so-called "jackpot". The jackpot is a prize that is won at a random time throughout game play. Many venues employ jackpot controllers for awarding jackpots to one of or more of a plurality of gaming machines participating in the jackpot. Typically, a portion of turnover on each gaming machine is forwarded to a jackpot controller as a contribution. That is, part of each wager from each gaming machine is forwarded to a central jackpot controller, and contributes to the jackpot. The technique can be implemented within a single gaming machine or may be extended to a so-called wide area jackpot where multiple gaming machines (from one or more different venues) contribute to a single jackpot pool. One common way of awarding a jackpot is a so called "symbol driven" jackpot, where a predetermined symbol pattern or win outcome triggers the jackpot.

There may also be provided a number of different symbol driven jackpots. For example, three different "levels" of symbol driven jackpot may be offered, such as a mini jackpot (typically in the order of a hundred dollars), a midi jackpot (typically in the order of a thousand dollars) and a maxi jackpot (typically in the order of tens of thousands of dollars). Each symbol driven jackpot is denoted by a different symbol. For example, one type of symbol may be associated with a mini jackpot (say, a "Jackpot1" symbol), another type of symbol may be associated with a midi jackpot (say, a "Jackpot2" symbol), and yet be associated with a maxi jackpot (say, a "Jackpot3" symbol). In this manner, a player can instantly recognise which type of jackpot they have won, if the correct combination of jackpot symbols appears at the conclusion of game play.

Figure 6:
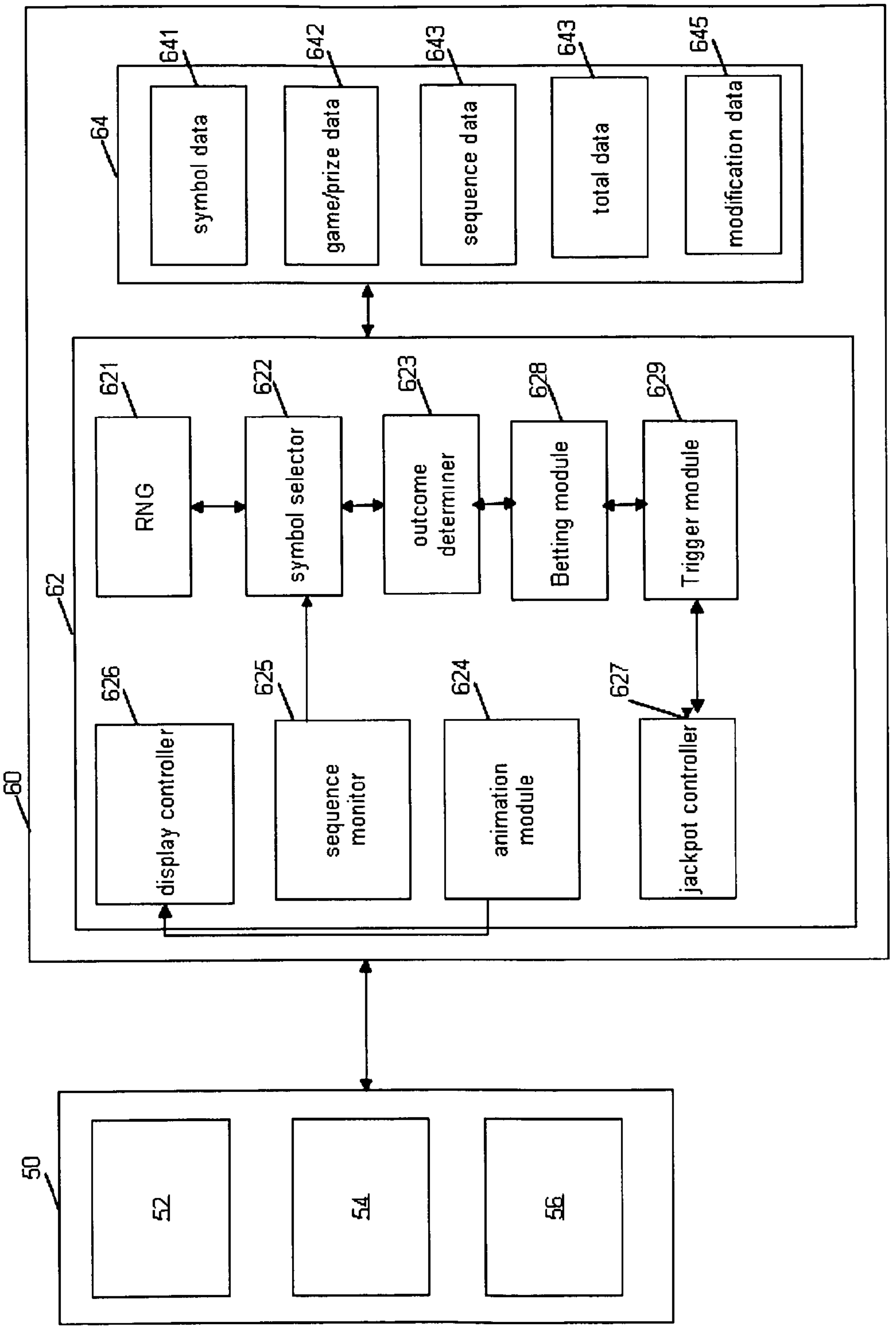
FIG. 6 is a schematic diagram of functional components of a gaming system in accordance with an embodiment of the present invention.

Win outcomes (such as the awarding of a jackpot) are controlled by the game controller 60, which is shown in more detail in FIG. 6. It will be apparent that the processor 62 implements a number of modules, namely random number generator module 621, symbol selector module 622, outcome determiner module 623, award determiner module 624, sequence monitoring module 625, display controller module 626, jackpot controller 627, betting module 628 and trigger module 629, each of which may utilise data stored in memory 64. Persons skilled in the art will appreciate that not all modules need be implemented by processor 62. For example, the random number generator module 621 could be implemented by a separate circuit or by a random number generator server.

In the illustrated embodiment, the award determiner module 624 determines when a player is entitled to an award. The award, in some instances, may be triggered by a so-called "symbol jackpot". That is, when a predetermined arrangement of symbols is displayed on the display, the player is awarded a jackpot prize. The jackpot prize may be an internal jackpot particular to a single gaming machine or may be extended to a so called wide area jackpot where multiple gaming machines (from one or more different venues) contribute to a single jackpot pool. Where a jackpot is a wide area jackpot, it will be understood that the jackpot controller 627 may reside outside any individual gaming machine.

During each game of a sequence, the symbol selector 622 selects the symbols to appear based on symbol data 641 which specifies the available symbols. The symbols are selected by the symbol selector using a random number obtained from the random number generator 621. The outcome determiner module 623 determines the game outcomes and their associated prizes based on the number of pay lines the player is playing and the symbol combinations. This data may be stored as game/prize data 642 and/or sequence data 643. Persons skilled in the art will also appreciate that the game outcomes and their associated prizes are displayed on the display 54 or under control of the display controller 626.

An award determiner 624 is employed to keep track of the total award which is stored as total data 644. Where a jackpot is awarded, the award determiner 624 may interface with a jackpot controller 627, so that when a jackpot is won, the jackpot award can be determined and communicated to the player, based on data received from the jackpot controller 627. The jackpot controller 627 may be internal to a single gaming machine, or may be an external device arranged to interface with a plurality of gaming machines (as previously described).

Figure 7:
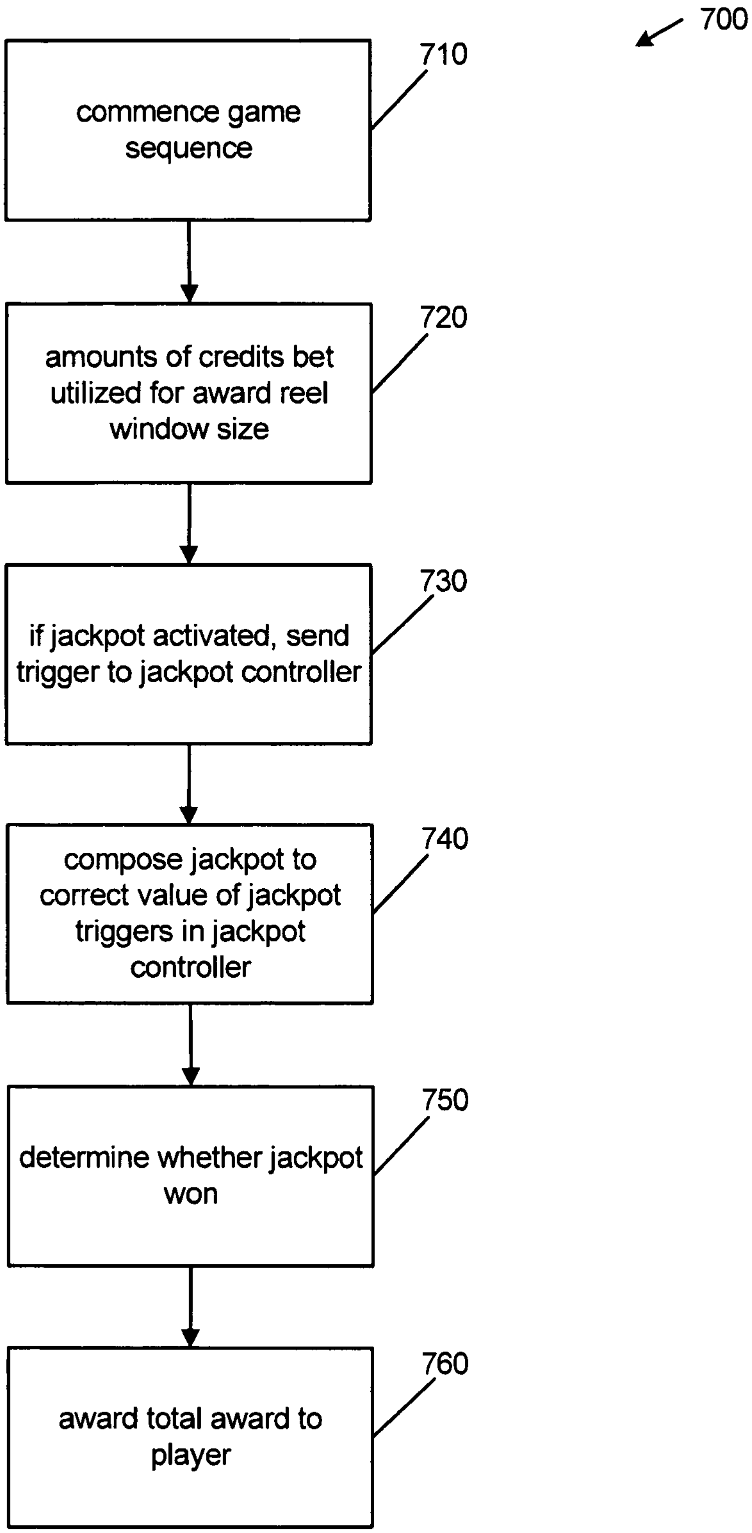
FIG. 7 is a flow diagram illustrating operation of a gaming system in accordance with an embodiment of the present invention.

Referring now to an embodiment in which a win outcome is influenced, the method steps carried out by a gaming machine (such as gaming device 120) is described in more detail, with reference to the method 700, summarised in FIG. 7. In FIG. 7, the prize awarded is a jackpot prize. However, it will be understood that the embodiment described with reference to FIG. 7 may apply equally to any win outcome.

On commencement of game play 710, a player bets an amount of credits. The amount of credit bet (determined by the betting module 628) is utilised to determine the size of the reel window 720. That is, the larger the number of credits wagered by the player, the larger the reel window (i.e. the greater the number of symbol positions appearing in the reel window). On the conclusion of game play, if a symbol jackpot has been achieved (i.e. if the correct number and/or pattern of symbols appears in the reel window), a jackpot trigger message is sent to the trigger module 629 of the jackpot controller (step 730) where it is compared 740 to the current value of the jackpot trigger (stored in memory). From the comparison, it is determined 750 whether to award a jackpot. If no jackpot is awarded the game awaits further input from a user (such as the initiation of a new game). If a jackpot is to be awarded, the award is made 760 and the jackpot resets before the next contribution is processed.

Referring now to step 720 in more detail, the reel window is increased according to a player's wager or bet amount. The bet amount may be the amount of credits bet per pay line, or the total bet amount (i.e. the number of credits bet per line multiplied by the number of pay lines selected). The manner in which the reel window is increased finds particular application in gaming machines that utilise Aristocrat Technologies Australia Pty Ltd's (a private Australian company) "Reel Power" technology. Reel power is a methodology whereby a player may purchase a "reel" rather than a row. This allows a player to achieve a win by (potentially) any combination of symbols in a reel window. For example, in a regular 5 by 3 window, by purchasing one reel (i.e. 3 elements), the player can form 3 possible paying "lines". If a player purchases two reels, the player can form 3×3=9 pay line combinations, thereby further increasing their probability of forming a winning combination. If a player purchases three reels, the player can form 3×3×3=27 pay line combinations, increasing their probability of a win outcome once again. The same is true for the purchase of 4 reels, which can form 81 pay line combinations, and 5 reels, which can form 243 pay line combinations. Pay line combinations can also be referred to as "ways" or "win lines".

Figure 8A:
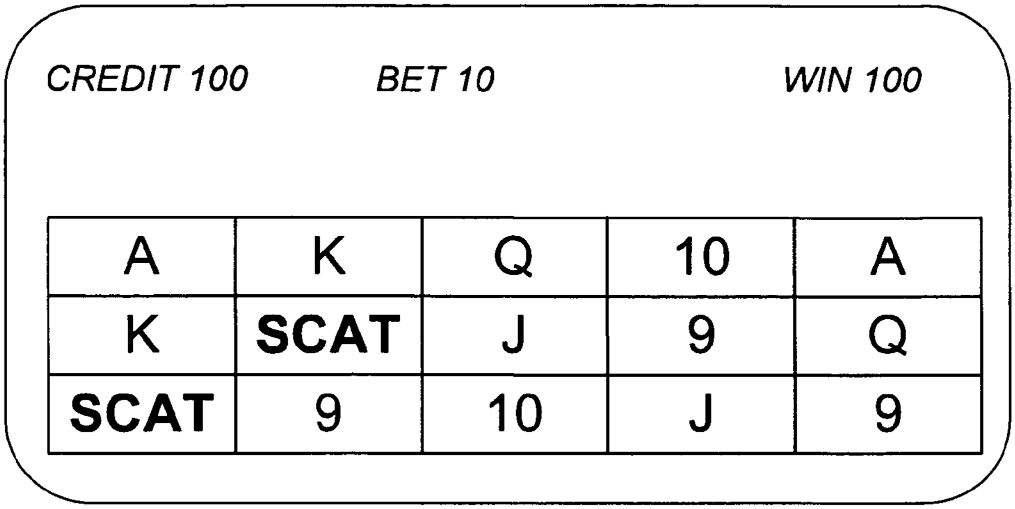
FIGS. 8*a* through 8*e* are representations of example displays generated by a gaming system in accordance with various embodiments of the present invention.
Figure 8B:
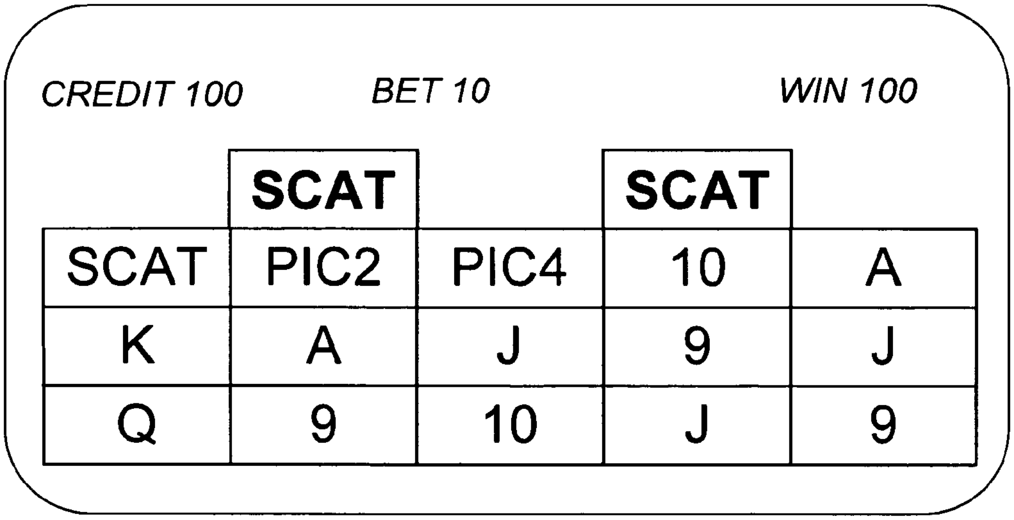

Applying the present embodiment to a Reel Power enabled gaming machine, it can be seen that increasing the reel window size (ie. the addition of additional symbols) increases the chance of a player winning a prize. The prize may be a jackpot prize, or a non jackpot prize. The winning of a jackpot prize is best illustrated by an example, with the aid of FIGS. 8*a* and 8*b*. In the example of FIGS. 8*a* and 8*b*, both examples are directed to an example where a jackpot is won by a player. However, it will be understood that the prize awarded may not be a jackpot, but may be some other prize.

Referring to FIG. 8*a*, the display 54 is arranged to display a reel window 800 including five virtual reels as designated by reference numerals 802*a* through 802*e*. Each virtual reel includes three standard symbol positions 804. In this example, players select columns of standard symbol positions to be included in their pay line combinations (i.e. such that symbols ultimately appearing in those selected symbol positions will be taken into account in determining game outcomes, as previously described). For a bet of one (1) credit per way, the reel window remains at the regular 5 by 3 reel window size (i.e. a normal "243 way" play) with 3, 9, 27, 81 and 243 way options. However, when the player's bet increases to two (2) credits per way, the reel window is increased by the addition of two additional "spaces" for a symbol to appear (as shown in FIG. 8*b*), effectively increasing the play to a "432 way" reel window with 3, 12, 36, 144 and 432 way options.

Correspondingly, when a player increases their bet to three (3) credits (not shown), the reel window grows to provide three additional spaces, providing a potential total of 576 ways, thereby further increasing the probability that a player can win a prize.

Referring specifically to FIG. 8*a*, a player is betting one credit, three ways. The reel spin is initiated by the player pressing the bet button rather than the "way" button. The prize (in this example a symbol prize jackpot) is won where three (3) or more SCAT (e.g., scatter) symbols appear at any location on the screen. As the player receives only two SCAT symbols, no prize is won.

If however (referring to FIG. 8*b*) the player chooses "3 ways" and presses the "bet 2" button, game play is initiated and reel window is enlarged to provide two additional "symbol" spaces. That is, at the conclusion of game play the screen appears as shown in FIG. 8*b*. As can be seen in FIG. 8*b*, two additional symbols, denoted by 810 and 820, appear. In the example of FIG. 8*b*, symbols 810 and 820 are jackpot SCAT symbols. Therefore, as the requirement for a jackpot is three SCAT symbols, the player wins the jackpot.

Figure 8C:
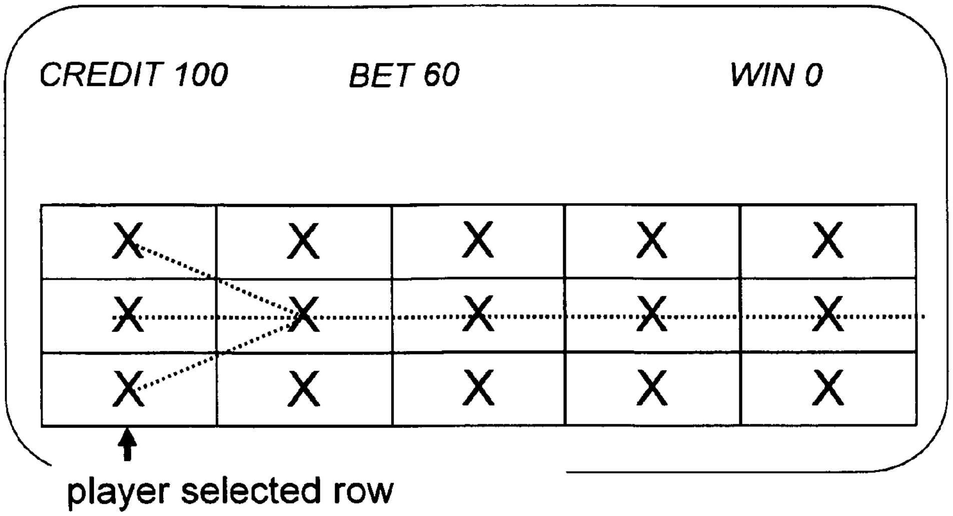
Figure 8D:
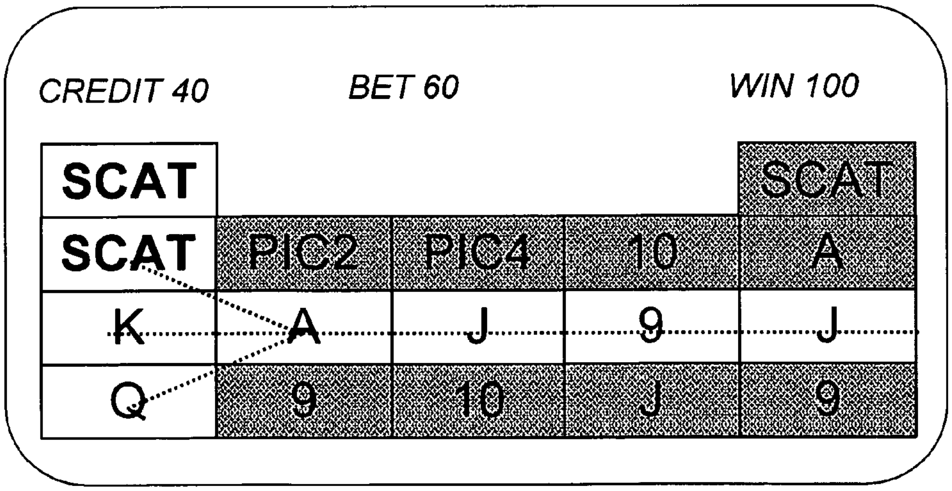

Referring now to FIGS. 8*c* and 8*d*, a further example embodiment is shown. According to this example, the one or more additional symbol positions are randomly associated with a particular row or column. The additional symbol positions only become active (i.e. capable of displaying a symbol) if an amount bet by the player meets or exceeds a particular threshold.

Referring to FIG. 8*c*, the player has elected to play the first column only (the centre line symbol positions are always selected). The dotted line shows the resulting three pay lines that will be used in determining the game outcome.

The additional symbol positions are not displayed until after the player has placed their bet (e.g. by selecting a reel spin button), so that the player is unable to establish whether the additional symbol positions will constitute part of a selected payline. After the player has placed their bet, the symbol selector module 622 selects symbols to display in the standard and additional (if active) symbol positions. According to FIG. 8D, the player has elected to bet twenty (20)

credits per pay line, which corresponds to two additional symbol positions. It will be appreciated by persons skilled in the art, however, that other betting functions could equally be used for determining the number of additional symbol positions to display apply (e.g. the number of additional symbols may be a function of the total amount bet, etc.).

With the aid of the RNG 621, the two additional symbol positions 810, 820 are positioned on top of reels 802*a* and 802*e* (although it will be appreciated that the additional symbol positions could be located either above or below the reels and equally on alternative ends of the rows). In the illustrated example, since the additional symbol 810 falls atop a player selected column, the displayed symbol can be used in determining a game outcome, whereas the second additional symbol 820 can not.

Figure 8E:
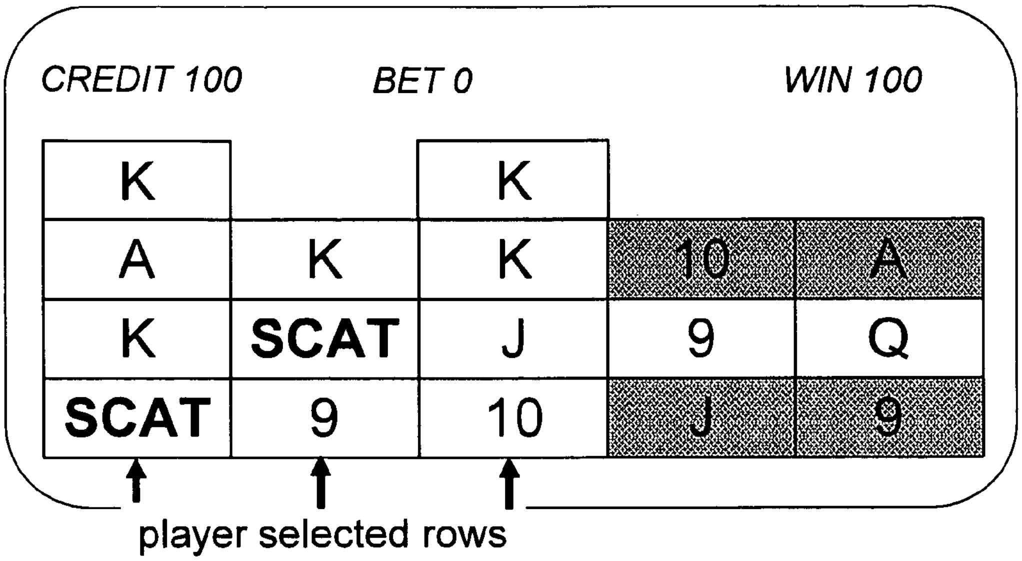

In another embodiment, additional symbol spaces can be used to form new pay lines. The player may, for example, be required to place an "ante-bet" (i.e. a bet over and above their standard bet) upon commencement of a game, which allows extra pay lines which include the additional symbol spaces to be awarded. Additional or alternative requirements may include that the additional symbol spaces are located in a particular position (e.g. atop a selected reel, etc). If the requirements are met, the corresponding additional pay lines are used in determining a game outcome. According to such an embodiment, the player is rewarded for selecting more columns since there is a greater likelihood that the additional symbols will be used to constitute winning pay lines. For example, according to the display representation shown in FIG. 8*e*, the player has selected to play the first three reels. Thus, additional symbol positions 810 and 820 can both be used to form pay lines with already selected symbols, affectively increasing the number of player selected pay lines from 27 to 48 (i.e. 4×3×4×1×1=48). If the player was to have purchased all reels, the number of resulting pay lines would equal 432 (i.e. 4×3×4×3×3=432), thereby greatly increasing the player's chance at achieving a winning outcome.

It will be understood that many variations may be made on the embodiment disclosed herein. For example, the symbols may not necessarily award the Jackpot, but may merely provide the player with a "chance" to win the jackpot, or the extra symbols may be utilised to form other winning combinations (not related to the winning of a jackpot).

In an embodiment where the additional symbols can result in a jackpot win outcome, there may be provided a plurality of symbol jackpots, each with a different value and each requiring a different symbol combination to be displayed for a win. For example, three different levels of symbol driven jackpot may be offered, such as a mini jackpot (typically in the order of a hundred dollars), a midi jackpot (typically in the order of a thousand dollars) and a maxi jackpot (typically in the order of tens of thousands of dollars). Each symbol driven jackpot is denoted by a different symbol. For example, one type of symbol may be associated with a mini jackpot (say, a "Jackpot1" symbol), another type of symbol may be associated with a midi jackpot (say, a "Jackpot2" symbol), and yet be associated with a maxi jackpot (say, a "Jackpot3" symbol). In this manner, a player can instantly recognise which type of jackpot they have won, if the correct combination of jackpot symbols appears at the conclusion of game play. In such a scenario, the additional symbols could display one or more of the three Jackpot symbols (or a combination thereof).

While the example given herein refers to a jackpot win outcome, it will be understood that the additional symbols may be utilised to form any suitable winning combination (jackpot or non jackpot). Indeed, the embodiment of the border invention disclosed herein may be utilised on a gaming machine where no jackpot is available.

It will be understood that while the embodiment described herein finds use with Aristocrat's "reel power" technology, other embodiments may be utilised in a conventional gaming machine. The embodiment and the broader invention described herein is not limited to one particular type of gaming machine. Such variations and modifications are within the purview of a person skilled in the art.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. It will be understood that the invention disclosed and defined in this specification extends to all alternative combinations of two or more of the individual features mentioned or evident from the text or drawings. All of these different combinations constitute various alternative aspects of the invention.

The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

The invention claimed is:

1. A triggering method for a win outcome for play of a game on a gaming device, the method comprising:

determining an amount of credit to wager on the game on commencement of game play on the gaming device, wherein the game comprises displaying a predefined plurality of symbols in respective initial display positions on a display of the gaming device, a winning outcome being defined by predetermined combinations of symbols displayed in the respective initial display positions; and setting a plurality of additional display positions to be displayed in the game in addition to the initial display positions, such that the total number of display positions displayed is proportional to the amount of credit wagered on the game, wherein wagering additional credit on play of the game thereby affects the probability of a win outcome being generated as a result of an increased number of total display positions, wherein the plurality of additional display positions are randomly positioned adjacent to one of the plurality of initial display positions, and wherein respective additional display positions are only active if they are adjacent an active initial display position.

2. A method as claimed in claim 1, further comprising satisfying a trigger condition when a specific symbol combination is displayed.

3. A method as claimed in claim 1, wherein the number of symbols displayed is increased by a particular amount when the amount of credit bet exceeds or meets a specific value.

4. A method as claimed in claim 1, wherein the game is a reel game and the number of symbols displayed is dependent on an amount bet per payline selected in the reel game.

5. A method as claimed in claim 2, comprising causing a feature game to commence, a prize to be awarded, or multiplying a prize for a winning outcome when the trigger condition is satisfied.

6. A method as claimed in claim 3, wherein the particular amount corresponds to the amount bet.

7. A jackpot triggering method for symbol jackpots, the method comprising:

determining an amount of credit to wager on the game on commencement of game play on the gaming device, wherein the game comprises displaying a predefined plurality of symbols in respective initial display positions on a display of the gaming device, a winning outcome being defined by predetermined combinations of symbols displayed in the respective initial display positions; and setting a plurality of additional display positions to be displayed in the game in addition to the initial display positions, such that the total number of display positions displayed is proportional to the amount of credit wagered on the game, wherein wagering additional credit on play of the game thereby affects the probability of a win outcome being generated as a result of an increased number of total display positions, wherein the plurality of additional display positions are randomly positioned adjacent to one of the plurality of initial display positions, and wherein respective additional display positions are only active if they are adjacent an active initial display position.

8. A method as claimed in claim 7, wherein a correct symbol combination causes the jackpot to be awarded to the player.

9. A method as claimed in claim 7, wherein a correct symbol combination invokes an additional game that provides the player with an opportunity to win the jackpot.

10. A method as claimed in claim 7, wherein a plurality of jackpots are available, each jackpot requiring a different symbol combination.

11. A controller arranged to control play of a game on a gaming device, the controller comprising:

a betting module operable to determine an amount of credit to wager on the game on commencement of game play on the gaming device, wherein the game comprises displaying a predefined plurality of symbols in respective initial display positions on a display of the gaming device, a winning outcome being defined by predetermined combinations of symbols displayed in the respective initial display positions; and a display module operable to set a plurality of additional display positions to be displayed in the game in addition to the initial display positions, such that the total number of display positions displayed is proportional to the amount of credit wagered on the game, wherein wagering additional credit on play of the game thereby affects the probability of a win outcome being generated as a result of an increased number of total display positions, wherein the plurality of additional display positions are randomly positioned adjacent to one of the plurality of initial display positions, and wherein respective additional display positions are only active if they are adjacent an active initial display position.

12. A controller as claimed in claim 11, further comprising a trigger module arranged to invoke a trigger condition upon determining that a specific symbol combination is displayed on the gaming device.

13. A controller as claimed in claim 11, wherein the number of symbols displayed is increased by a particular value when the amount of credit bet exceeds or meets a specific value.

14. A controller as claimed in claim 11, wherein the game is a reel game and the number of symbols displayed is dependent on an amount bet per payline selected in the reel game.

15. A controller as claimed in claim 12, comprising causing a feature game to commence, a prize to be awarded, or multiplying a prize for a winning outcome when the trigger condition is invoked.

16. A controller as claimed in claim 13, wherein the particular value corresponds to the amount bet.

17. A gaming system comprising:

a plurality of gaming devices which may participate in a jackpot by making jackpot contributions; and a jackpot controller arranged to:

for each of the plurality of gaming devices, determine an amount of credit to wager on the game on commencement of game play on the gaming device, wherein the game comprises displaying a predefined plurality of symbols in respective initial display positions on a display of the gaming device, a winning outcome being defined by predetermined combinations of symbols displayed in the respective initial display positions; and set a plurality of additional display positions to be displayed in the game in addition to the initial display positions, such that the total number of display positions displayed is proportional to the amount of credit wagered on the game, wherein wagering additional credit on play of the game thereby affects the probability of a win outcome being generated as a result of an increased number of total display positions, wherein the plurality of additional display positions are randomly positioned adjacent to one of the plurality of initial display positions, and wherein respective additional display positions are only active if they are adjacent an active initial display position.

18. A gaming system comprising:

a display operable to display a predefined plurality of initial symbol positions and optionally one or more additional symbol positions;

a betting module arranged to determine an amount wagered on a game on commencement of the game;

a symbol selector arranged to select symbols for display in the plurality of initial symbol positions, a winning outcome being defined by predetermined combinations of symbols displayed in the respective initial display positions, and, dependent on the amount wagered, further arranged to select and display symbols in the additional symbol position(s); and an outcome determiner arranged to determine an outcome of the game based on the displayed symbols, wherein the plurality of additional display positions displayed in the game in addition to the initial display positions is set such that the total number of display positions is proportional to the amount of credit wagered on the game, wherein wagering additional credit on play of the game thereby affects the probability of a win outcome being generated as a result of an increased number of total display positions, wherein the plurality of additional display positions are randomly positioned adjacent to one of the plurality of initial display positions, and wherein respective additional display positions are only active if they are adjacent an active initial display position.

19. A gaming system as claimed in claim 18, wherein the symbol selector displays a symbol in the additional symbol position(s) when the amount bet meets or exceeds a designated threshold.

20. A gaming system as claimed in claim 18, wherein the system is arranged such that when a particular number or combination of symbols are displayed in the standard and/or additional symbol positions, a trigger condition is satisfied.

21. A gaming system as claimed in claim 18, wherein the plurality of standard symbols are displayed in a format having an array of rows and columns and whereby the or each additional symbol position is associated with one of the rows or columns.

22. A gaming system as claimed in claim 20, wherein the trigger condition causes a feature game to commence, triggers a win outcome, or multiplies a prize awarded for a winning outcome.

23. A gaming system as claimed in claim 22, wherein the win outcome is the awarding of a jackpot prize.

24. A gaming system as claimed in claim 21, wherein the system is arranged such that standard symbol positions define at least one player selectable payline used to determine a game outcome, and such that symbols displayed in the additional symbol position(s) can also form part of a payline dependent on their location.

25. A gaming system as claimed in claim 24, wherein the row or column with which the, or each, additional symbol position is associated is randomly determined.

26. A tangible computer readable storage medium comprising computer program code which when executed implements a triggering method for a win outcome on a gaming device, the method comprising:

determining an amount of credit to wager on the game on commencement of game play on the gaming device, wherein the game comprises displaying a predefined plurality of symbols in respective initial display positions on a display of the gaming device, a winning outcome being defined by predetermined combinations of symbols displayed in the respective initial display positions; and setting a plurality of additional display positions to be displayed in the game in addition to the initial display positions, such that the total number of display positions displayed is proportional to the amount of credit wagered on the game, wherein wagering additional credit on play of the game thereby affects the probability of a win outcome being generated as a result of an increased number of total display positions, wherein the plurality of additional display positions are randomly positioned adjacent to one of the plurality of initial display positions, and wherein respective additional display positions are only active if they are adjacent an active initial display position.

* * * * *